United States Patent
Matsui et al.

(10) Patent No.: US 8,160,541 B2
(45) Date of Patent: Apr. 17, 2012

(54) TERMINAL APPARATUS AND COMMUNICATION SYSTEM

(75) Inventors: Ryohei Matsui, Kariya (JP); Tatsuya Shintai, Chita-gun (JP); Yoshio Koie, Handa (JP)

(73) Assignee: Denso Corporation, Kariya (JP)

( * ) Notice: Subject to any disclaimer, the term of this patent is extended or adjusted under 35 U.S.C. 154(b) by 232 days.

(21) Appl. No.: 12/657,823

(22) Filed: Jan. 28, 2010

(65) Prior Publication Data

US 2010/0190465 A1    Jul. 29, 2010

(30) Foreign Application Priority Data

Jan. 28, 2009   (JP) .................................. 2009-17227

(51) Int. Cl.
- H04M 11/00 (2006.01)
- H04M 1/00 (2006.01)
- H04M 11/04 (2006.01)
- H04W 4/00 (2009.01)
- G06F 19/00 (2011.01)

(52) U.S. Cl. ............... 455/404.1; 455/435.1; 455/556.1; 701/36; 379/45

(58) Field of Classification Search ............... 455/404.1, 455/435.1, 556.1; 701/36; 379/45
See application file for complete search history.

(56) References Cited

U.S. PATENT DOCUMENTS

| | | | |
|---|---|---|---|
| 6,625,659 B1 * | 9/2003 | Aramizu et al. ............... 709/239 |
| 2002/0018547 A1 | 2/2002 | Takae et al. | |
| 2003/0086539 A1 * | 5/2003 | McCalmont et al. ........... 379/45 |
| 2005/0078657 A1 * | 4/2005 | Huey ............................ 370/352 |
| 2005/0216903 A1 * | 9/2005 | Schaefer ....................... 717/168 |
| 2006/0040705 A1 * | 2/2006 | Kawakami et al. ........... 455/561 |
| 2008/0119983 A1 * | 5/2008 | Inbarajan et al. ............... 701/36 |

FOREIGN PATENT DOCUMENTS

| JP | 2000-134359 | 5/2000 |
|---|---|---|
| JP | 2001-356984 | 12/2001 |
| JP | 2002-057798 | 2/2002 |
| JP | 2006-124943 | 5/2006 |
| JP | 2007-179522 | 7/2007 |

* cited by examiner

*Primary Examiner* — Ariel Balaoing
(74) *Attorney, Agent, or Firm* — Harness, Dickey & Pierce, PLC

(57) ABSTRACT

A terminal apparatus for communicating with an information center via a network includes: a memory for storing current and new connection destination information when the apparatus receives the new connection destination information from the center; a first trial element for trying communication connection to the center based on the new connection destination information after the center switches from the current connection destination information to the new connection destination information; and a second trial element for trying communication connection to the center based on the current connection destination information when the first trial element fails to perform the communication connection. The memory maintains to store the current connection destination information until the first connection trial element succeeds to perform the communication connection.

14 Claims, 4 Drawing Sheets

TERMINAL APPARATUS AND COMMUNICATION SYSTEM

CROSS REFERENCE TO RELATED APPLICATION

This application is based on Japanese Patent Application No. 2009-17227 filed on Jan. 28, 2009, the disclosure of which is incorporated herein by reference.

FIELD OF THE INVENTION

The present invention relates to a terminal apparatus for communicating with an information center via a wireless communication network, and a communication system thereof.

BACKGROUND OF THE INVENTION

Conventionally, a telematics service for providing information service in real time is well known. The service is provided by a communication system together with a mobile body such as a vehicle. In the service, an in-vehicle communication module executes to download a map data and a POI (point of interest) data from a service center for updating a data in a navigation system, to upload a data for aggregating dialog information of an in-vehicle device to the service center, and the like with using a wireless communication network. For example, JP-A-2006-124943 teaches an in-vehicle communication module for communicating with a center via a communication line.

One of the telematics service is emergency call service, which is provided by Japan Mayday Service Co., Ltd. In the emergency call service, when the in-vehicle device executes an emergency call, the in-vehicle communication module performs data communication with the emergency call center. Here, the in-vehicle communication module has a function for performing maintenance and inspection so that the module inspects whether a function for performing the emergency call is well. When the in-vehicle communication module executes the maintenance and inspection, the emergency call center transmits information to the in-vehicle communication module. The information is information about connection destination (specifically, a URL) for the emergency call and the maintenance and inspection and information about date (i.e., switching time) at which the connection switches to the connection destination showing the information about connection destination.

The information about connection destination in the emergency call center may be changed to new information about connection destination temporally or permanently because maintenance of equipment in the emergency call center is provided, or the equipment is updated. In this case, the emergency call center notifies new connection destination information to the in-vehicle communication module, which has been maintained and inspected. The in-vehicle communication module stores "present connection destination information" and "new connection destination information" in a memory. The present connection, destination information shows the connection destination information for communicating with the emergency call center at the present time. The new connection destination information shows the next connection destination information. Further, the in-vehicle communication module also stores the switching date, at which the present connection destination information is switched to the new connection destination information. After the switching date, the module overwrites the present connection destination information with the new connection destination information, and deletes the present connection destination information, which is used before, from the memory.

However, in a conventional art, when the connection destination information of the emergency call center is temporally switched, and the new connection destination information transmitted from the emergency call center is not correct, the in-vehicle communication module cannot communicate with the emergency call center correctly after the switching date so that the module cannot perform the maintenance and inspection normally. Specifically, even when the connection destination information of the center is temporally switched, and thereby, the module switches from the new connection destination information to the previous connection destination information after a predetermined time has elapsed, the in-vehicle communication module cannot communicate with the emergency call center during a temporally switching term. Further, the in-vehicle communication module cannot communicate with the emergency call center even when the previous connection destination information is reversed after the predetermined time has elapsed. This is because the present connection destination information, which is used before, is deleted from the memory when the switching date has come in the prior art.

SUMMARY OF THE INVENTION

In view of the above-described problem, it is an object of the present disclosure to provide a terminal apparatus for communicating with an information center via a wireless communication network, and a communication system thereof.

According to a first aspect of the present disclosure, a terminal apparatus communicates with an information center via a wireless communication network in such a manner that the terminal apparatus receives connection destination information for communicating with the center and the terminal apparatus stores the connection destination information. The apparatus includes: a connection destination information memory for storing current connection destination information and new connection destination information when the terminal apparatus receives the new connection destination information from the center, wherein the new connection destination information is to be switched from the current connection destination information, and the current connection destination information is preliminarily stored in the connection destination information memory; a first connection trial element for trying communication connection to the information center based on the new connection destination information after the center switches from the current connection destination information to the new connection destination information; and a second connection trial element for trying communication connection to the information center based on the current connection destination information when the first connection trial element fails to perform the communication connection to the information center based on the new connection destination information. The connection destination information memory maintains to store the current connection destination information until the first connection trial element succeeds to perform the communication connection to the information center based on the new connection destination information. The above apparatus communicates with the center via the network so that data communication between the center and the apparatus are stably performed.

According to a second aspect of the present disclosure, a communication system for telematics service includes: the terminal apparatus according to the first aspect of the present disclosure; and the information center. The terminal apparatus performs data communication with the information center via the wireless communication network. The apparatus communicates with the center via the network so that data communication between the center and the apparatus are stably performed.

According to a third aspect of the present disclosure, a terminal apparatus communicates with an information center via a wireless communication network in such a manner that the terminal apparatus receives connection destination information for communicating with the center and the terminal apparatus stores the connection destination information. The apparatus includes: a connection destination information memory for storing current connection destination information and new connection destination information when the terminal apparatus receives the new connection destination information from the center, wherein the new connection destination information is to be switched from the current connection destination information, and the current connection destination information is preliminarily stored in the connection destination information memory; a third connection trial element for trying communication connection to the information center based on the current connection destination information after the center switches from the current connection destination information to the new connection destination information; and a fourth connection trial element for trying communication connection to the information center based on the new connection destination information when the third connection trial element fails to perform the communication connection to the information center based on the current connection destination information. The third connection trial element retries the communication connection to the information center based on the current connection destination information when the fourth connection trial element fails to perform the communication connection to the information center based on the new connection destination information, and the connection destination information memory maintains to store the current connection destination information until the fourth connection trial element succeeds to perform the communication connection to the information center based on the new connection destination information. The apparatus communicates with the center via the network so that data communication between the center and the apparatus are stably performed.

According to a fourth aspect of the present disclosure, a communication system for telematics service includes: the terminal apparatus according to the third aspect of the present disclosure; and the information center. The terminal apparatus performs data communication with the information center via the wireless communication network. The apparatus communicates with the center via the network so that data communication between the center and the apparatus are stably performed.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
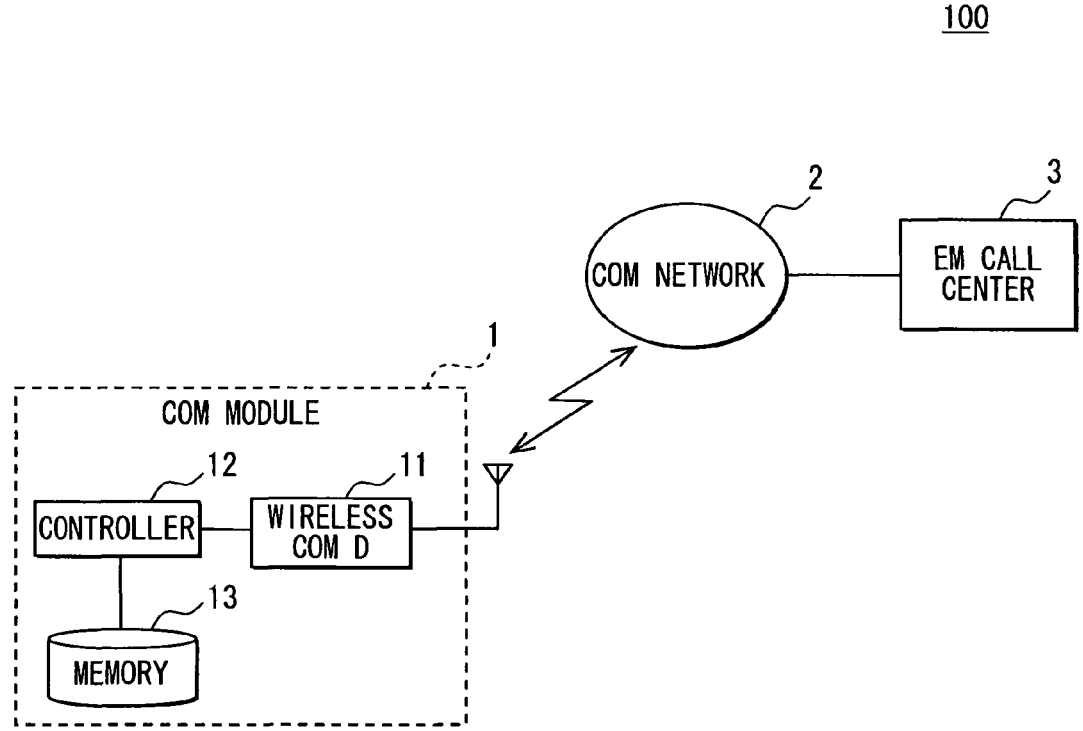
FIG. 1 is a block diagram showing an emergency call system according to an example embodiment.

FIG. 1 shows an emergency call system 100. The system 100 includes an in-vehicle communication module 1, a wireless communication network 2 and an emergency call center 3.

The module 1 is mounted on a vehicle. The module 1 communicates with the emergency call center 3 via the wireless communication network 2. Further, the module 1 carries on a conversation with the center 3 via the network 2. The module 1 is, for example, a DCM (data communication module), which is mounted on the vehicle. Here, the DCM is an in-vehicle communication device for telematics communication. The vehicle mounting the module 1 is defined as a subject vehicle.

The network 2 is a communication network for coupling between the module 1 and the center 3. The network 2 is, for example, a conventional cell phone network. The network 2 is also connected to the Internet via a computer, which is controlled by a provider of the network 2. The module 1 is capable of coupling with the Internet.

The module 1 directly communicates with a base station, which is connected to a terminal of the wireless communication network 2 so that the module 1 communicates with the emergency call center 3 via the wireless communication network 2. Specifically, the module 1 exchanges data with the center 3 via the network 2. The base station is a conventional base station, which is arranged on a power pole, on a top of a building, on a telephone booth, on a ceiling of a subway station, or the like.

The emergency call center 3 is one of information centers for providing the telematics service. The center 3 receives an emergency call from the module 1 via the network 2. Further, the center 3 notifies connection destination information and information about switching date to the module 1 via the network 2. The center 3 is, for example, an operation center for the emergency call service as one of the telematics service. The emergency call from the module 1 to the center 1 is, for example, notice of information about car accident, notice of information about car breakdown, notice of information about theft of the vehicle, which are data communication, and inquiry from a driver of the vehicle, which is verbal communication. The emergency call from the module 1 may be executed by user operation for inputting an instruction into an operation input element (not shown) in the module 1. Alternatively, the emergency call may be executed automatically in conjunction with emergency action of the vehicle such as inflation of an air bag system in the vehicle.

The system 100 executes the maintenance and inspection for confirming whether communication connection between the module 1 and the center 3 can be performed before the service for receiving the emergency call from the module 1 with the center 3 starts. In the maintenance and inspection, the user inputs the connection destination information in the module 1 via an operation input element (not shown). The connection destination information provides for communication connection from the module 1 to the center 3. Here, the connection destination information for communicating and connecting the module 1 to the center 3 is, for example, a URL. The module 1 specifies the connection destination according to the connection destination information, which is input by the user via the operation input element. Thus, the module 1 makes a trial for communicating with the center 3. This maintenance and inspection executed before the service starts is defined as manual maintenance and inspection.

After the manual maintenance and inspection is performed, the periodic maintenance and inspection is executed automatically. The periodic maintenance and inspection is defined as automatic maintenance and inspection. Here, the module 1 starts to execute the automatic maintenance and inspection as a trigger when the module 1 detects that an ignition switch of the vehicle turns on. Alternatively, the module 1 may start the automatic maintenance and inspection not only as the trigger when the module 1 detects that the ignition switch of the vehicle turns on but also as a trigger when a predetermined time has elapsed.

In the system 100, the connection destination information may be switched temporally or permanently from the current connection destination information to new connection destination information since, for example, equipment of the center 3 is maintained or updated. In this case, the center 3 notifies the new connection destination information and information about switching date of the new connection destination information to the module 1 having executed the maintenance and inspection. In this embodiment, for example, the connection destination information of the maintenance and inspection is the same as the connection destination information of the actual emergency call. When the connection destination information of the maintenance and inspection and the connection destination information of the actual emergency call are the same connection destination information, data such as an identifier for distinguishing the information of the maintenance and inspection from the information of the actual emergency call is attached to the information, which is transmitted from the module 1 to the center 3 so that the center 3 can distinguish between the information of the maintenance and inspection and the information of the actual emergency call when the module 1 sends the information to the center 3.

A construction of the module 1 will be explained. As shown in FIG. 1, the module 1 includes a wireless communication device 11, a controller 12 and a memory 13.

The wireless communication device 11 directly communicates with a base station via a communication antenna by wireless. The base station is connected to the wireless communication network 2. Thus, the module 1 transmits and receives a data communication signal for data communication and a verbal communication signal for verbal communication from the center 3 via the network 2. When the center 3 transmits at least one of the connection destination information and the information about the switching date via the network 2 to the module 1, the wireless communication device 11 transfers the connection destination information and/or the information about the switching date to the controller 12. The wireless communication device 11 makes a trial for communication connection with the center 3 according to the connection destination information. When the communication connection is successful, the wireless communication device 11 executes transmission and reception of the data communication signal and the verbal communication signal.

The controller 12 is a microcomputer having a CPU, a ROM, a RAM, a backup RAM, an I/O element and the like (not shown). Various programs stored in the ROM are executed so that various processes are performed. The controller 12 executes various processes such as a process in a conventional DCM. The controller 12 writes the connection destination information and the information about the switching date, which are sent, from the wireless communication element 11 in the memory 13. The controller 12 controls the wireless communication device 11 to transmit the information to the center 3, the information being notified to the center 3 in case of the maintenance and inspection and the emergency call.

The memory 13 is a storing device for electrically rewriting contents in the memory 13. Thus, the memory 13 stores various information. The memory 13 stores the connection destination information and the information about the switching date when the controller 12 controls the memory 13 to write the connection destination information and the information about the switching date. Thus, the memory 13 functions as a connection destination information storing element. When the center 3 transmits the new connection destination information to the module 1, the memory 13 stores both of the present connection destination information and the new connection destination information. Here, the present connection destination information is current connection destination information for connecting between the module 1 and the center 3 at the present time, which has been stored in the memory 13. The new connection destination information is updated connection destination information, which is to be switched from the current connection destination information.

The controller 12 executes connection destination switching trial process for determining whether a switching time from the current connection destination information to the new connection destination information is proper and for executing a trial for switching from the current connection destination information to the new connection destination information.

Figure 2:
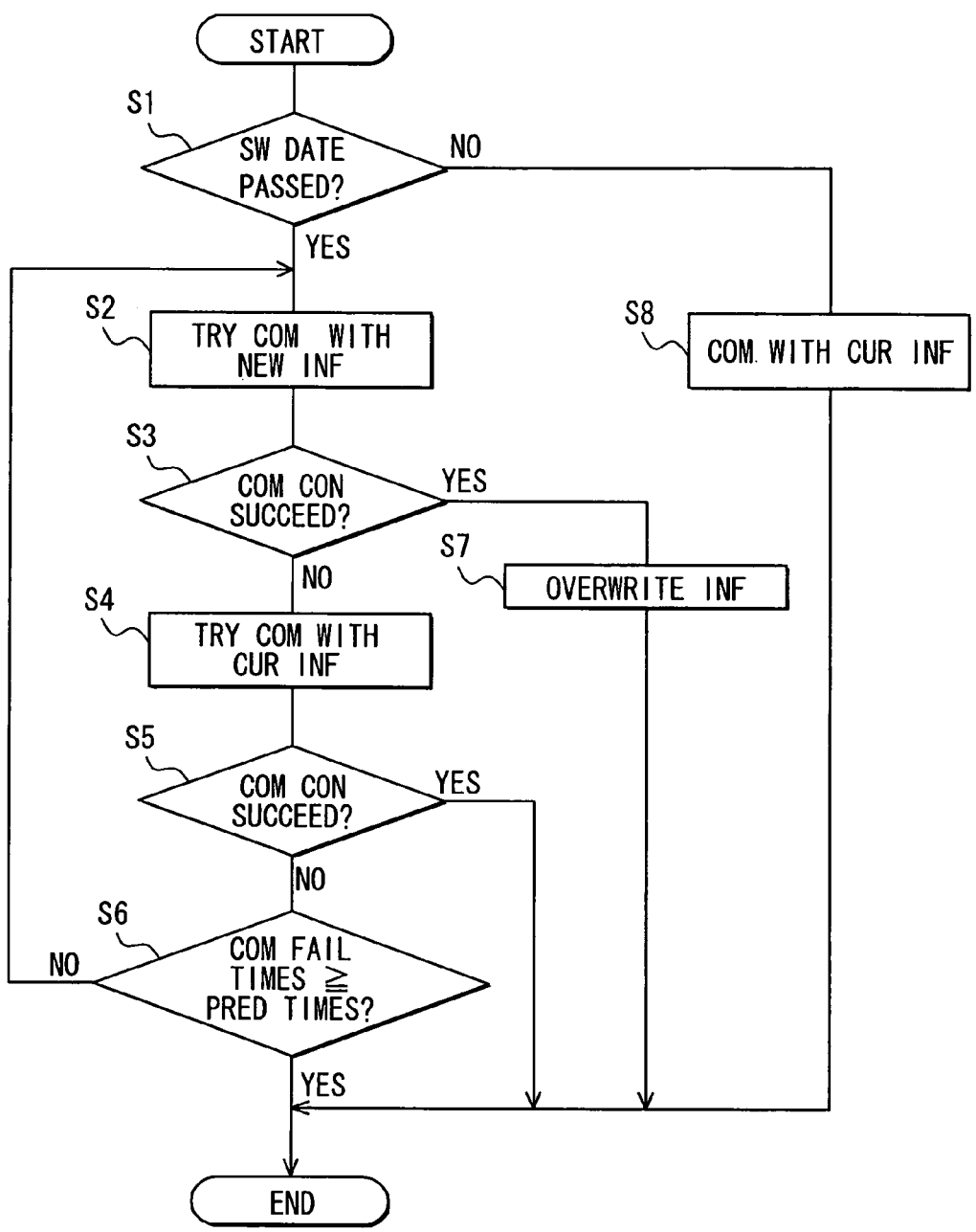
FIG. 2 is a flowchart showing a connection switching trial process in an in-vehicle communication module.

Next, the connection destination switching trial process in the module 1 will be explained with reference to FIG. 2. FIG. 2 is a flowchart of one example of the connection destination switching trial process. The module 1 starts to perform the process when an ignition switch of the vehicle turns on, and a power source of the module 1 turns on.

In step S1, the controller 12 reads information about the switching date stored in the memory 13 so that the controller 12 determines whether the switching date has passed. The determination is performed by comparing the switching date and the current time. The information about the current time is obtained by the module 1 from an in-vehicle navigation device in the vehicle. When the controller 12 determines that the switching date has passed (i.e., when the determination in step S1 is "YES"), it goes to step S2. When the controller 12 determines that the switching date does not have passed (i.e., when the determination in step S1 is "NO"), it goes to step S8.

In step S2, the controller 12 executes an instruction for the wireless communication device 11 so that the wireless communication device 11 tries to communicate with the emergency call center 3 according to new information about connection destination. Then, it goes to step S3. Thus, the controller 12 functions as a first connection trial element. The trial of communication connection in step S2 may be performed by a conventional trial of communication connection.

In step S3, when the trial of communication connection with the emergency call center 3 according to the new connection destination information is successful (i.e., the determination in step S3 is "YES"), it goes to step S7. When the trial of communication connection with the emergency call center 3 according to the new connection destination information is unsuccessful (i.e., the determination in step S3 is "NO"), it goes to step S4.

In step S4, the controller 12 executes an instruction for the wireless communication device 11 so that the wireless communication device 11 tries to communicate with the emergency call center 3 according to current information about connection destination. Then, it goes to step S5. Thus, the controller 12 functions as a second connection trial element. The trial of communication connection in step S4 may be performed by a conventional trial of communication connection.

In step S5, when the trial of communication connection with the emergency call center 3 according to the current connection destination information is successful (i.e., the determination in step S5 is "YES"), the process ends. When the trial of communication connection with the emergency call center 3 according to the current connection destination information is unsuccessful (i.e., the determination in step S5 is "NO"), it goes to step S6. In step S5, the number of failure times of the communication connection in step S5 is counted by the controller 12 every time when the trial of communication connection with the emergency call center 3 fails. The number of failure times is defined as the number of communication failure times.

In step S6, the controller 12 determines whether the number of communication failure times exceeds a predetermined number of times. Here, the predetermined number of times can be set freely. When the controller 12 determines that the number of communication failure times exceeds a predetermined number of times (i.e., the determination in step S6 is "YES"), the controller 12 controls a display to show an error message thereon, and the process ends. When the controller 12 determines that the number of communication failure times does not exceed the predetermined number of times (i.e., the determination in step S6 is "NO"), it returns to step S2.

In step S7, an overwrite step is executed, and the process ends. In the overwrite step, the controller 12 overwrite the current connection destination information with the new connection destination information, and deletes the current connection destination information from the memory 13. Thus, the controller 12 functions as a stored information deleting element. Thus, the memory 13 only stores the new connection destination information. After that, the new connection destination information provides current connection destination information stored in the memory 13.

In step S8, the controller 12 executes an instruction for the wireless communication device 11 so that the wireless communication device 11 communicates with the emergency call center 3 according to current information about connection destination. Thus, the process in FIG. 2 ends.

Here, in this embodiment, the process in FIG. 2 starts when the ignition switch of the vehicle turns on, and the power source of the module 1 turns on. Alternatively, the process in FIG. 2 may start when the accessory switch of the vehicle turns on, and the power source of the module 1 turns on. Further, the process in FIG. 2 may start when a battery initially supplies electricity to the module 1 in a case where the battery supplies electricity to the module 1 at all times.

Thus, the memory 13 stores the current connection destination information until the communication connection with the emergency call center 3 according to the new connection destination information succeeds. After the emergency call center 3 switches from the current connection destination information to the new connection destination information, the controller 12 executes the trial of communication connection with using the new connection destination information. Then, when the communication connection fails, the controller 12 executes the trial of communication connection with using the current connection destination information. Thus, in a case where the emergency call center 3 temporally switches from the current connection destination information to the new connection destination information, and the center 3 changes the new connection destination information back to the current connection destination information after a predetermined time has elapsed, even if the emergency call center 3 sends wrong new connection destination information to the module 1, the module 1 can communicate with the emergency, call center 3 according to the current connection destination information after the predetermined time has elapsed.

Further, in a case where the emergency call center 3 permanently switches from the current connection destination information to the new connection destination information, the center 3 does not change the new connection destination information back to the current connection destination information after a predetermined time has elapsed, and the module 1 can communicate with the center 3 according to any one of the new connection destination information and the current connection destination information during the predetermined time after the center 3 switches to the new connection destination information, even if the emergency call center 3 sends wrong new connection destination information to the module 1, the module 1 can communicate with the emergency call center 3 according to the current connection destination information during the predetermined time. When the module 1 receives the correct new connection destination information from the center during the predetermined time, the module 1 can communicate with the emergency call center 3 according to the correct new connection destination information after the predetermined time has elapsed. Thus, in the present embodiment, the module 1 communicates with the center 3 via the network 2 so that data communication and verbal communication between the center 3 and the module 1 are stably performed. Thus, the module 1 functions as a terminal device for telematics service.

Figure 3:
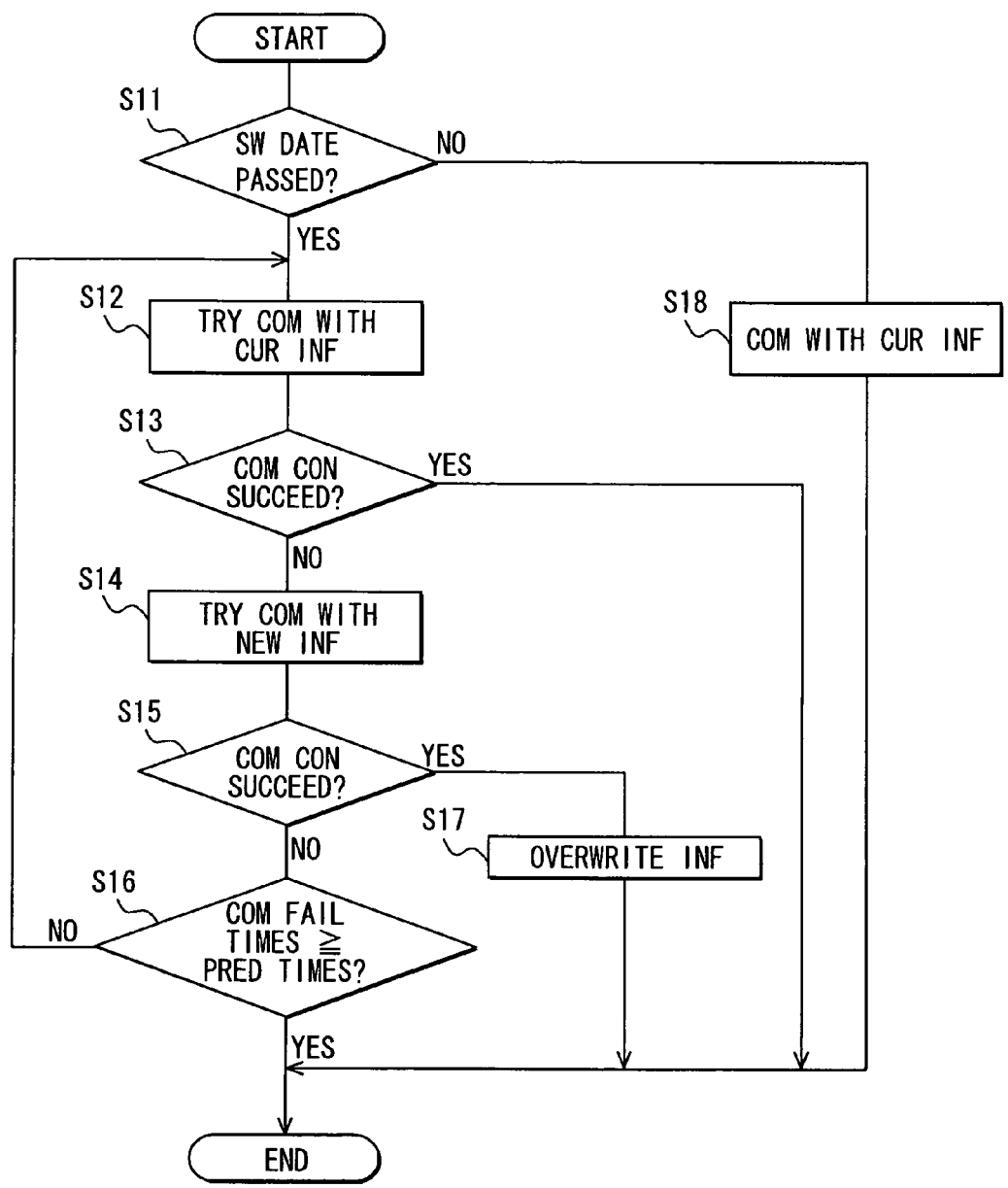
FIG. 3 is a flowchart showing another connection switching trial process in the in-vehicle communication module.

When the controller 12 determines that the switching date has passed, the controller 12 may execute the trial of communication connection with the center 3 according to the new connection destination information after the controller 12 executes the trial of communication connection with the center 3 according to the current connection destination information. This connection switching trial process of the module 1 will be explained. FIG. 3 shows an example of the connection switching trial process of the module 1. The controller 12 may start the process when the ignition switch of the vehicle turns on, and the power source of the module 1 turns on.

In step S11, the controller 12 determines whether the switching date has passed. When the controller 12 determines that the switching date has passed (i.e., when the determination in step S11 is "YES"), it goes to step S12. When the controller 12 determines that the switching date does not have passed (i.e., when the determination in step S11 is "NO"), it goes to step S18.

In step S12, the controller 12 executes an instruction for the wireless communication device 11 so that the wireless communication device 11 tries to communicate with the emergency call center 3 according to current information about connection destination. Then, it goes to step S13. Thus, the controller 12 functions as a third connection trial element. The trial of communication connection in step S12 may be performed by a conventional trial of communication connection.

In step S13, when the trial of communication connection with the emergency call center 3 according to the current connection destination information is successful (i.e., the determination in step S13 is "YES"), the process ends. When the trial of communication connection with the emergency call center 3 according to the current connection destination information is unsuccessful (i.e., the determination in step S13 is "NO"), it goes to step S14.

In step S14, the controller 12 executes an instruction for the wireless communication device 11 so that the wireless communication device 11 tries to communicate with the emergency call center 3 according to new information about connection destination. Then, it goes to step S15. Thus, the controller 12 functions as a fourth connection trial element. The trial of communication connection in step S14 may be performed by a conventional trial of communication connection.

In step S15, when the trial of communication connection with the emergency call center 3 according to the new connection destination information is successful (i.e., the determination in step S15 is "YES"), it goes to step S17. When the trial of communication connection with the emergency call center 3 according to the new connection destination information is unsuccessful (i.e., the determination in step S15 is "NO"), it goes to step S16. In step S15, the number of failure times of the communication connection in step S15 is counted by the controller 12 every time when the trial of communication connection with the emergency call center 3 fails. The number of failure times is defined as the number of communication failure times.

In step S16, the controller 12 determines whether the number of communication failure times exceeds a predetermined number of times. When the controller 12 determines that the number of communication failure times exceeds a predetermined number of times (i.e., the determination in step S16 is "YES"), the controller 12 controls a display to show an error message thereon, and the process ends. When the controller 12 determines that the number of communication failure times does not exceed the predetermined number of times (i.e., the determination in step S16 is "NO"), it returns to step S12.

In step S17, an overwrite step is executed, and the process ends. In step S18, the controller 12 executes an instruction for the wireless communication device 11 so that the wireless communication device 11 communicates with the emergency call center 3 according to current information about connection destination. Then, the process in FIG. 3 ends.

Here, in this embodiment, the process in FIG. 3 starts when the ignition switch of the vehicle turns on, and the power source of the module 1 turns on. Alternatively, the process in FIG. 3 may start when the accessory switch of the vehicle turns on, and the power source of the module 1 turns on. Further, the process in FIG. 3 may start when a battery initially supplies electricity to the module 1 in a case where the battery supplies electricity to the module 1 at all times.

Thus, the memory 13 stores the current connection destination information until the communication connection with the emergency call center 3 according to the new connection destination information succeeds. After the emergency call center 3 switches from the current connection destination information to the new connection destination information, the controller 12 executes the trial of communication connection with using the current connection destination information, and then, the controller 12 executes the trial of communication connection with using the new connection destination information. Then, when both of the communication connections with using the current connection destination information and new connection destination information fail, the controller 12 executes the trial of communication connection with using the current connection destination information again. Thus, in a case where the emergency call center 3 temporally switches from the current connection destination information to the new connection destination information, and the center 3 changes the new connection destination information back to the current connection destination information after a predetermined time has elapsed, even if the emergency call center 3 sends wrong new connection destination information to the module 1, the module 1 can communicate with the emergency call center 3 according to the current connection destination information after the predetermined time has elapsed.

Further, in a case where the emergency call center 3 permanently switches from the current connection destination information to the new connection destination information, the center 3 does not change the new connection destination information back to the current connection destination information after a predetermined time has elapsed, and the module 1 can communicate with the center 3 according to any one of the new connection destination information and the current connection destination information during the predetermined time after the center 3 switches to the new connection destination information, even if the emergency call center 3 sends wrong new connection destination information to the module 1, the module 1 can communicate with the emergency call center 3 according to the current connection destination information during the predetermined time. When the module 1 receives the correct new connection destination information from the center during the predetermined time, the module 1 can communicate with the emergency call center 3 according to the correct new connection destination information after the predetermined time has elapsed. Thus, in the present embodiment, the module 1 communicates with the center 3 via the network 2 so that data communication and verbal communication between the center 3 and the module 1 are stably performed.

Here, the memory 13 may store connection destination information for emergency call and connection destination information for maintenance and inspection, independently. In this case, the memory 13 stores current connection destination information and new connection destination information for emergency call and current connection destination information and new connection destination information for maintenance and inspection. Thus, the memory 13 stores four different connection destination information. The connection switching trial process is performed for each of the connection destination information for emergency call and connection destination information for maintenance and inspection, independently. When the module 1 succeeds the communication connection with using the new connection destination information, the module overwrites the present connection destination information with the new connection destination information for at least one of the emergency call and the maintenance and inspection, in which the communication connection is successful.

In a case where the memory 13 may store connection destination information for emergency call and connection destination information for maintenance and inspection, independently, although the connection destination information for emergency call is the same as the connection destination information for maintenance and inspection, the module may overwrite the present connection destination information with the same new connection destination information (i.e., the new connection destination information for the maintenance and inspection) for both of the emergency call and the maintenance and inspection when, for example, the module succeeds the communication connection with using the new connection destination information for the maintenance and inspection.

Figure 4:
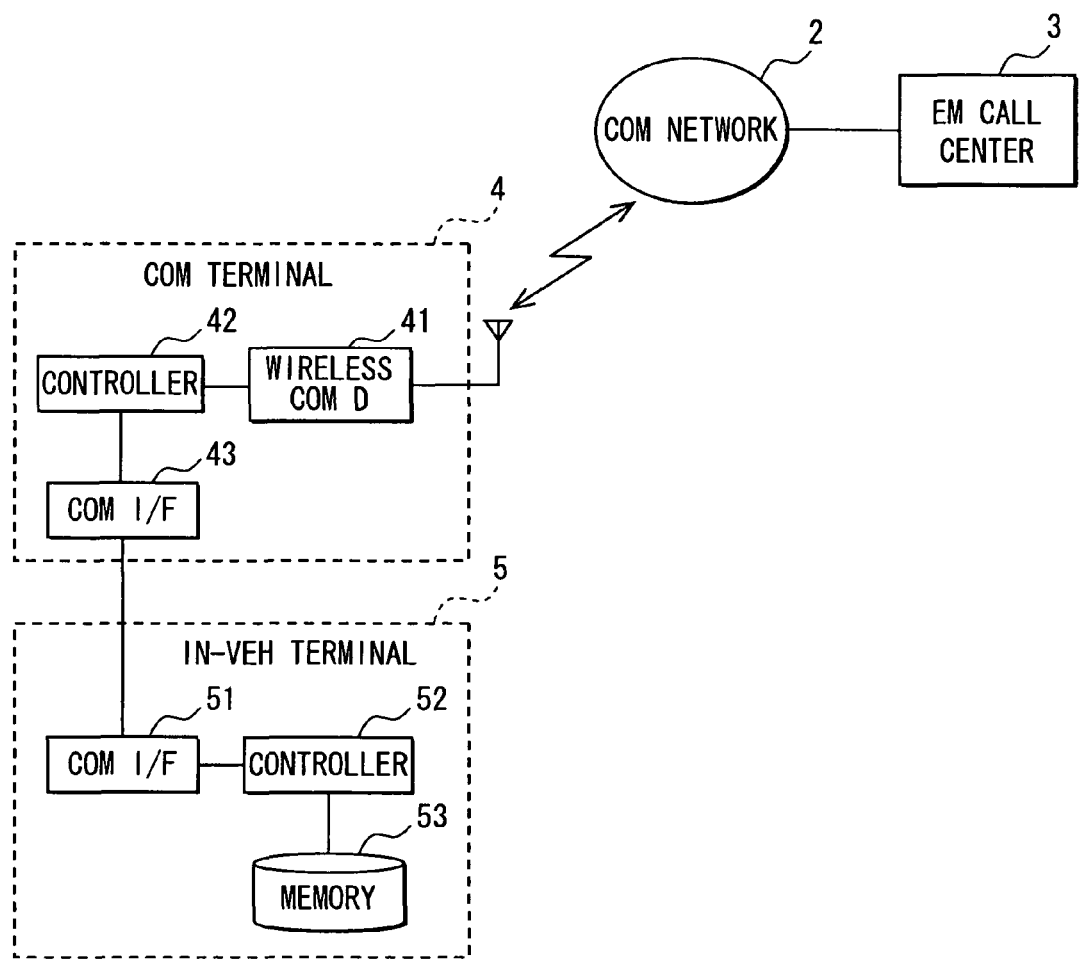
FIG. 4 is a block diagram showing another emergency call system according to another example embodiment.

In the above embodiment, the module 1 as the terminal device performs alone the data communication and the verbal communication with the emergency call center 3. For example, the terminal device does not include function for performing the data communication and the verbal communication with the emergency call center 3, and thereby, the terminal device may perform the data communication and the verbal communication with the emergency call center 3 via an independent communication terminal. FIG. 4 shows an example of an emergency call system 100a with using the communication terminal.

The system 100a includes a wireless communication network 2, an emergency call center 3, a communication terminal 4 and an in-vehicle terminal 5. Thus, the function of the module 1 in FIG. 1 is provided by the communication terminal 4 and the in-vehicle terminal 5.

The communication terminal 4 is, for example, mounted on a vehicle, or carried by a user. Thus, the communication terminal 4 is a mobile communication terminal. The communication terminal 4 communicates with the emergency call center 3 via the wireless communication network 2. Further, the communication terminal 4 carries on a conversation with the center 3 via the network 2. The communication terminal 4 is, for example, a DCM (data communication module) or a cell phone. The communication terminal 4 includes a wireless communication device 41, a controller 42 and a communication I/F 43.

The wireless communication device 41 functions similar to the wireless communication device 11 in FIG. 1. The controller 42 is a microcomputer having a CPU, a ROM, a RAM, a backup RAM, an I/O element and the like (not shown). Various programs stored in the ROM are executed so that various processes are performed. The controller 42 controls the communication I/F 43 to transmit the information to the in-vehicle terminal 5, the information such as connection destination information and switching date information being transmitted from the wireless communication device 41. The controller 42 controls the wireless communication device 41 to transmit information to the emergency call center 3, the information such as information to be notified to the center 3 in case of maintenance and inspection or emergency call being transmitted from the in-vehicle terminal 5 via the communication I/F 43. Further, the communication I/F 43 transmits and receives information with the communication I/F 51 in the in-vehicle terminal 5 via a communication line.

The in-vehicle terminal 5 is mounted on the vehicle. The in-vehicle terminal 5 performs data communication and verbal communication with the center 3 via the communication terminal 4. The in-vehicle terminal 5 is, for example, an in-vehicle navigation device. The in-vehicle terminal 5 includes the communication I/F 51, a controller 52 and a memory 53. The in-vehicle terminal 5 has the same function as the module 1 in FIG. 1 other than communication function for data communication and verbal communication.

The communication I/F 51 transmits and receives information with the communication I/F 43 of the communication terminal 4 via a communication line. The communication I/F 51 sends information such as connection destination information and switching date information to the controller 52, the information being transmitted from the communication terminal 4.

The controller 52 is a microcomputer having a CPU, a ROM, a RAM, a backup RAM, an I/O element and the like (not shown). Various programs stored in the ROM are executed so that various processes are performed. The controller 52 writes the connection destination information and the information about the switching date, which are sent from the communication I/F 51, in the memory 53. The controller 52 controls the communication I/F 51 to transmit the information to the communication terminal 4, the information being notified to the center 3 in case of the maintenance and inspection and the emergency call.

The controller 52 executes connection switching trial process. The controller 52 sends an instruction for performing the connection switching trial process to the controller 42 in the communication terminal 4 via the communication I/F 51 and the communication I/F 43 so that the communication terminal 4 execute the connection switching trial process. Thus, the controller 52 functions as a first connection trial element, a second connection trial element, a third connection trial element, a fourth connection trial element and a stored information deleting element.

The memory 53 is a storing device for electrically rewriting contents in the memory 53. Thus, the memory 53 stores various information. The memory 53 stores the connection destination information and the information about the switching date. Thus, the memory 53 functions as a connection destination information storing element.

In the system 100a in FIG. 4, the communication of information between the communication terminal 4 and the in-vehicle terminal 5 is performed via the communication line, which provides wired communication. Alternatively, the communication of information between the communication terminal 4 and the in-vehicle terminal 5 may be performed with wireless communication such as a Bluetooth (which is registered trademark) communication method.

In the system 100a, the communication terminal 4 does not include a memory for storing the connection destination information and the switching date information. Alternatively, the communication terminal 4 may include a memory for storing the connection destination information and the switching date information so that the connection destination information and the switching date information are stored in each of the communication terminal 4 and the in-vehicle terminal 5.

In the system 100a, the connection switching trial process is performed by the controller 52 in the in-vehicle terminal 5. Alternatively, the connection switching trial process may be performed by the controller 42 in the communication terminal 4.

In the systems 100, 100a, the module 1 and the in-vehicle terminal 5 with using the communication terminal 4 performs the data communication with the emergency call center 3 via the wireless communication network 2 so that emergency call service as one of telematics service is performed. Alternatively, the systems 100, 100a may perform other services of the telematics service as long as the center 1 and the terminal device such as the module 1 and the in-vehicle terminal 5 with using the communication terminal 4 execute data communication via the network 2.

The above disclosure has the following aspects.

According to a first aspect of the present disclosure, a terminal apparatus communicates with an information center via a wireless communication network in such a manner that the terminal apparatus receives connection destination information for communicating with the center and the terminal apparatus stores the connection destination information. The apparatus includes: a connection destination information memory for storing current connection destination information and new connection destination information when the terminal apparatus receives the new connection destination information from the center, wherein the new connection destination information is to be switched from the current connection destination information, and the current connection destination information is preliminarily stored in the connection destination information memory; a first connection trial element for trying communication connection to the information center based on the new connection destination information after the center switches from the current connection destination information to the new connection destination information; and a second connection trial element for trying communication connection to the information center based on the current connection destination information when the first connection trial element fails to perform the communication connection to the information center based on the new connection destination information. The connection destination information memory maintains to store the current connection destination information until the first connection trial element succeeds to perform the communication connection to the information center based on the new connection destination information.

Thus, the memory stores the current connection destination information until the communication connection with the center according to the new connection destination information succeeds. After the center switches from the current connection destination information to the new connection destination information, the apparatus executes the trial of communication connection with using the new connection destination information. Then, when the communication connection fails, the apparatus executes the trial of communication connection with using the current connection destination information. Thus, in a case where the center temporally switches from the current connection destination information to the new connection destination information, and the center changes the new connection destination information back to the current connection destination information after a predetermined time has elapsed, even if the center sends wrong new connection destination information to the apparatus, the apparatus can communicate with the center according to the current connection destination information after the predetermined time has elapsed.

Further, in a case where the center permanently switches from the current connection destination information to the new connection destination information, the center does not change the new connection destination information back to the current connection destination information after a predetermined time has elapsed, and the apparatus can communicate with the center according to any one of the new connection destination information and the current connection destination information during the predetermined time after the center switches to the new connection destination information, even if the center sends wrong new connection destination information to the apparatus, the apparatus can communicate with the center according to the current connection destination information during the predetermined time. When the apparatus receives the correct new connection destination information from the center during the predetermined time, the apparatus can communicate with the center according to the correct new connection destination information after the predetermined time has elapsed. Thus, the apparatus communicates with the center via the network so that data communication between the center and the apparatus are stably performed.

Alternatively, the connection destination information memory may further store switching date information when the terminal apparatus receives the switching date information together with the new connection destination information from the center. The switching date information represents a switching date at which the center switches from the current connection destination information to the new connection destination information, and the first connection trial element determines that the center switches from the current connection destination information to the new connection destination information when the switching date has passed.

Alternatively, the terminal apparatus may further include: a stored information deleting element for deleting the current connection, destination information in the connection destination information memory when the first connection trial element succeeds to perform the communication connection to the information center based on the new connection destination information.

According to a second aspect of the present disclosure, a communication system for telematics service includes: the terminal apparatus according to the first aspect of the present disclosure; and the information center. The terminal apparatus performs data communication with the information center via the wireless communication network. The apparatus communicates with the center via the network so that data communication between the center and the apparatus are stably performed.

Alternatively, the information center may be an emergency call center for handling emergency call. Alternatively, the terminal apparatus may be an in-vehicle communication module, which solely performs the data communication with the information center via the wireless communication network. Alternatively, the communication system may further include: a communication terminal for solely performing the data communication with the information center via the wireless communication network. The communication terminal executes the data communication with the terminal apparatus via second wired or wireless communication network. The terminal apparatus performs the data communication with the information center via the second wired or wireless communication network, the communication terminal and the wireless communication network.

According to a third aspect of the present disclosure, a terminal apparatus communicates with an information center via a wireless communication network in such a manner that the terminal apparatus receives connection destination information for communicating with the center and the terminal apparatus stores the connection destination information. The apparatus includes: a connection destination information memory for storing current connection destination information and new connection destination information when the terminal apparatus receives the new connection destination information from the center, wherein the new connection destination information is to be switched from the current connection destination information, and the current connection destination information is preliminarily stored in the connection destination information memory; a third connection trial element for trying communication connection to the information center based on the current connection destination information after the center switches from the current connection destination information to the new connection destination information; and a fourth connection trial element for trying communication connection to the information center based on the new connection destination information when the third connection trial element fails to perform the communication connection to the information center based on the current connection destination information. The third connection trial element retries the communication connection to the information center based on the current connection destination information when the fourth connection trial element fails to perform the communication connection to the information center based on the new connection destination information, and the connection destination information memory maintains to store the current connection destination information until the fourth connection trial element succeeds to perform the communication connection to the information center based on the new connection destination information.

Thus, the memory stores the current connection destination information until the communication connection with the center according to the new connection destination information succeeds. After the center switches from the current connection destination information to the new connection destination information, the apparatus executes the trial of communication connection with using the current connection destination information, and then, the apparatus executes the trial of communication connection with using the new connection destination information. Then, when both of the communication connections with using the current connection destination information and new connection destination information fail, the apparatus executes the trial of communication connection with using the current connection destination information again. Thus, in a case where the center temporally switches from the current connection destination information to the new connection destination information, and the center changes the new connection destination information back to the current connection destination information after a predetermined time has elapsed, even if the center sends wrong new connection destination information to the apparatus, the apparatus can communicate with the center according to the current connection destination information after the predetermined time has elapsed.

Further, in a case where the center permanently switches from the current connection destination information to the new connection destination information, the center does not change the new connection destination information back to the current connection destination information after a predetermined time has elapsed, and the apparatus can communicate with the center according to any one of the new connection destination information and the current connection destination information during the predetermined time after the center switches to the new connection-destination information, even if the center sends wrong new connection destination information to the apparatus, the apparatus can communicate with the center according to the current connection destination information during the predetermined time. When the apparatus receives the correct new connection destination information from the center during the predetermined time, the apparatus can communicate with the center according to the correct new connection destination information after the predetermined time has elapsed. Thus, the apparatus communicates with the center via the network so that data communication between the center and the apparatus are stably performed.

Alternatively, the connection destination information memory may further store switching date information when the terminal apparatus receives the switching date information together with the new connection destination information from the center. The switching date information represents a switching date at which the center switches from the current connection destination information to the new connection destination information, and the third connection trial element determines that the center switches from the current connection destination information to the new connection destination information when the switching date has passed.

According to a fourth aspect of the present disclosure, a communication system for telematics service includes: the terminal apparatus according to the third aspect of the present disclosure; and the information center. The terminal apparatus performs data communication with the information center via the wireless communication network. The apparatus communicates with the center via the network so that data communication between the center and the apparatus are stably performed.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A communication apparatus as a terminal apparatus for telematic service, which performs data communication with an information center via a wireless communication network wherein the terminal apparatus receives a notice of connection destination information for communicating and connecting with the information center by the data communication, and the terminal apparatus stores the connection destination information received in the notice, the communication apparatus comprising:

a connection destination information storing device storing new connection destination information in addition to current connection destination information, which is preliminary stored in the connection destination information storing device, when the terminal apparatus receives the new connection destination information from the information center, wherein the new connection destination information is to be switched with the current connection destination information;

a first connection trial device trying communication connection to the information center based on the new connection destination information after the information center switches from the current connection destination information to the new connection destination information; and a second connection trial device trying communication connection to the information center based on the current connection destination information when the first connection trial device tries and fails to perform the communication connection to the information center based on the new connection destination information, wherein the connection destination information storing device maintains the current connection destination information in storage without deleting until the first connection trial device succeeds in performing the communication connection to the information center based on the new connection destination information.

2. The communication apparatus according to claim 1, wherein the connection destination information storing device further stores switching date information when the terminal apparatus receives a notification of the switching date information showing a switching date, at which the new connection destination information is to be switched from the current connection destination information, together with the new connection destination information to be switched from the current connection destination information, from the information center; and wherein the first connection trial device performs a process and determines that the information center switches from the current connection destination information to the new connection destination information when the switching date has passed.

3. The communication apparatus according to claim 1, further comprising:
a stored information deleting device deleting the current connection destination information stored in the connection destination information storing device when the communication apparatus succeeds in performing the communication connection to the information center based on the new connection destination information.

4. A communication system for telematics service, comprising:
the terminal apparatus according to claim 1; and
the information center,
wherein the terminal apparatus performs data communication with the information center via the wireless communication network.

5. The communication system according to claim 4,
wherein the information center is an emergency call center for handling emergency call.

6. The communication system according to claim 4,
wherein the terminal apparatus is an in-vehicle communication module, which solely performs the data communication with the information center via the wireless communication network.

7. The communication system according to claim 4, further comprising:
a communication terminal for solely performing the data communication with the information center via the wireless communication network,
wherein the communication terminal is capable of executing the data communication with the terminal apparatus in a wired or wireless manner, and
wherein the terminal apparatus is an in-vehicle terminal, which is capable of performing the data communication with the information center via the wireless communication network and the communication terminal.

8. A communication apparatus as a terminal apparatus for telematic service, which performs data communication with an information center via a wireless communication network wherein the terminal apparatus receives a notice of connection destination information for communicating and connecting with the information center by the data communication, and the terminal apparatus stores the connection destination information received in the notice, the communication apparatus comprising:
a connection destination information storing device storing new connection destination information in addition to current connection destination information, which is preliminary stored in the connection destination information storing device, when the terminal apparatus receives the new connection destination information from the information center, wherein the new connection destination information is to be switched with the current connection destination information;
a first connection trial device trying communication connection to the information center based on the current connection destination information after the information center switches from the current connection destination information to the new connection destination information; and
a second connection trial device trying communication connection to the information center based on the new connection destination information when the first connection trial device tries and fails to perform the communication connection to the information center based on the current connection destination information,
wherein the first connection trial device retries the communication connection to the information center based on the current connection destination information when the second connection trial device tries and fails to perform the communication connection to the information center based on the new connection destination information, and
wherein the connection destination information storing device maintains the current connection destination information in storage without deleting until the second connection trial device succeeds in performing the communication connection to the information center based on the new connection destination information.

9. The communication apparatus according to claim 8,
wherein the connection destination information storing device further stores switching date information when the terminal apparatus receives a notification of the switching date information showing a switching date, at which the new connection destination information is to be switched from the current connection destination information, together with the new connection destination information to be switched from the current connection destination information, from the information center; and
wherein the first connection trial device performs a process and determines that the information center switches from the current connection destination information to the new connection destination information when the switching date has passed.

10. The communication apparatus according to claim 8, further comprising:
a stored information deleting device deleting the current connection destination information stored in the connection destination information storing device when the communication apparatus succeeds in performing the communication connection to the information center based on the new connection destination information.

11. A communication system for telematics service comprising:
the terminal apparatus according to claim 8; and
the information center,
wherein the terminal apparatus performs data communication with the information center via the wireless communication network.

12. The communication system according to claim 11,
wherein the information center is an emergency call center for handling emergency call.

13. The communication system according to claim 11,
wherein the terminal apparatus is an in-vehicle communication module, which solely performs the data communication with the information center via the wireless communication network.

14. The communication system according to claim 11, further comprising:
a communication terminal for solely performing the data communication with the information center via the wireless communication network,
wherein the communication terminal is capable of executing the data communication with the terminal apparatus in a wired or wireless manner, and
wherein the terminal apparatus is an in-vehicle terminal, which is capable of performing the data communication with the information center via the wireless communication network and the communication terminal.

* * * * *